United States Patent
Cypher

(10) Patent No.: US 6,901,495 B2
(45) Date of Patent: May 31, 2005

(54) CACHE MEMORY SYSTEM ALLOWING CONCURRENT READS AND WRITES TO CACHE LINES TO INCREASE SNOOP BANDWITH

(75) Inventor: Robert Cypher, Saratoga, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 10/673,654

(22) Filed: Sep. 29, 2003

(65) Prior Publication Data

US 2004/0073740 A1 Apr. 15, 2004

Related U.S. Application Data

(63) Continuation of application No. 09/792,103, filed on Feb. 23, 2001, now Pat. No. 6,629,205, which is a continuation of application No. 09/306,272, filed on May 6, 1999, now Pat. No. 6,289,420.

(51) Int. Cl.[7] .............................................. G06F 12/12
(52) U.S. Cl. ...................... 711/167; 711/118; 711/154; 711/155
(58) Field of Search ................ 711/117–120, 141–145, 711/154, 155, 168

(56) References Cited

U.S. PATENT DOCUMENTS

| | | | | |
|---|---|---|---|---|
| 5,488,709 A | * | 1/1996 | Chan | 711/118 |
| 5,524,212 A | * | 6/1996 | Somani et al. | 711/121 |
| 5,644,753 A | * | 7/1997 | Ebrahim et al. | 711/131 |
| 5,732,241 A | * | 3/1998 | Chan | 711/131 |
| 5,930,819 A | * | 7/1999 | Hetherington et al. | 711/131 |
| 6,061,766 A | * | 5/2000 | Lynch et al. | 711/146 |
| 6,076,147 A | * | 6/2000 | Lynch et al. | 711/146 |
| 6,081,873 A | * | 6/2000 | Hetherington et al. | 711/131 |

FOREIGN PATENT DOCUMENTS

EP 0365281 * 4/1990

* cited by examiner

Primary Examiner—T Nguyen
(74) Attorney, Agent, or Firm—Meyertons Hood Kivlin Kowert & Goetzel, P.C.

(57) ABSTRACT

A cache memory includes a plurality of memory chips, or other separately addressable memory sections, which are configured to collectively store a plurality of cache lines. Each cache line includes data and an associated cache tag. The cache tag may include an address tag which identifies the line as well as state information indicating the coherency state for the line. Each cache line is stored across the memory chips in a row formed by corresponding entries (i.e., entries accessed using the same index address). The plurality of cache lines is grouped into separate subsets based on index addresses, thereby forming several separate classes of cache lines. The cache tags associated with cache lines of different classes are stored in different memory chips. During operation, the cache controller may receive multiple snoop requests corresponding to, for example, transactions initiated by various processors. The cache controller is configured to concurrently access the cache tags of multiple lines in response to the snoop requests if the lines correspond to differing classes.

23 Claims, 4 Drawing Sheets

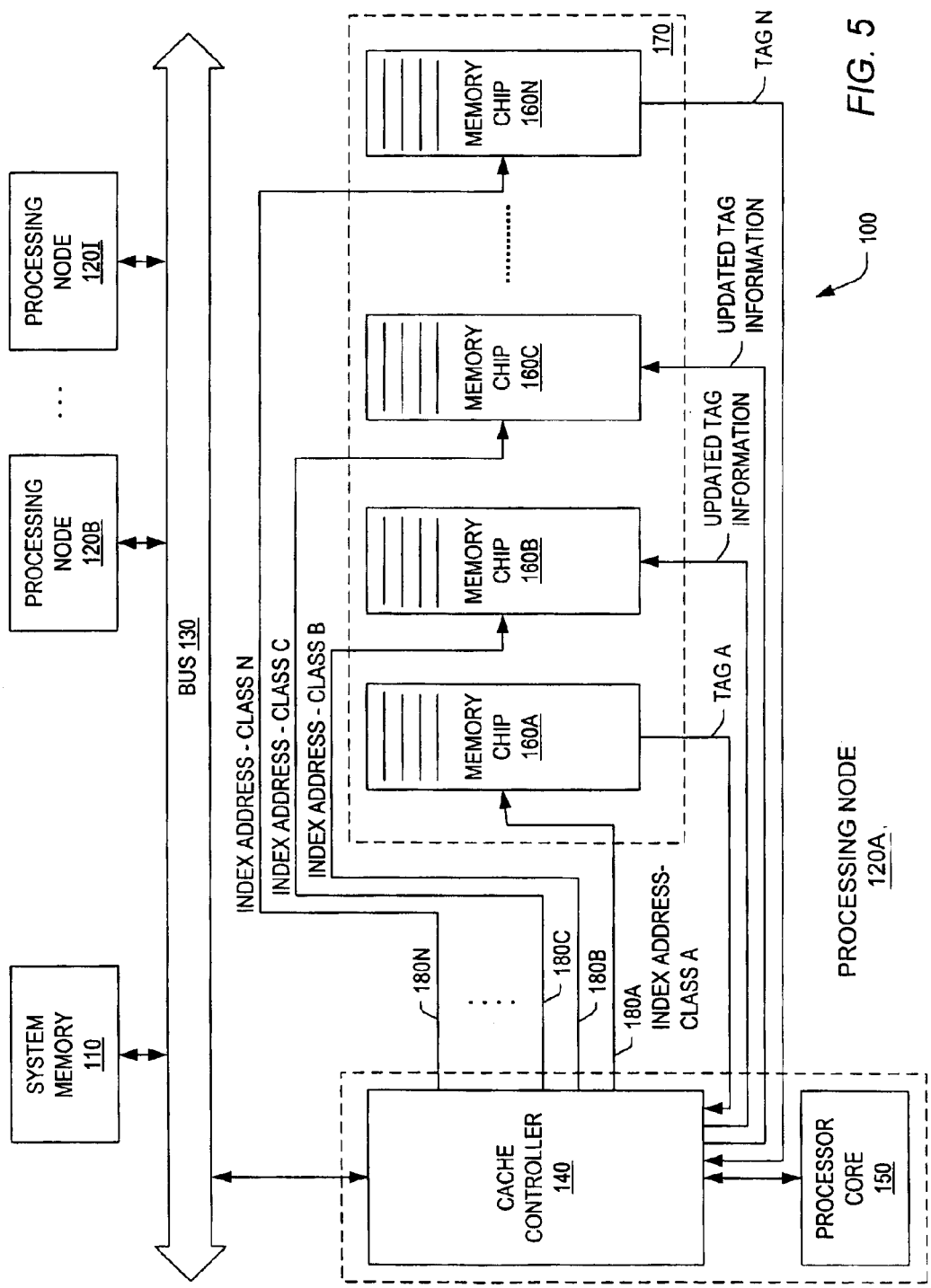

CACHE MEMORY SYSTEM ALLOWING CONCURRENT READS AND WRITES TO CACHE LINES TO INCREASE SNOOP BANDWITH

This application is a continuation application of U.S. patent application Ser. No. 09/792,103, filed Feb. 23, 2001, now U.S. Pat. No. 6,629,205, which is a continuation of U.S. patent application Ser. No. 09/306,272, filed May 6, 1999, now U.S. Pat. No. 6,289,420.

BACKGROUND OF THE INVENTION

1. Field of the Invention

This invention generally relates to multiprocessor computer systems that employ cache memory subsystems and, more particularly, to a cache memory subsystem that allows concurrent accesses of cache line tags stored within a cache memory.

2. Description of the Relevant Art

A cache memory is a high-speed memory unit interposed in the memory hierarchy of a computer system between a slower system memory and a processor. A cache typically stores recently used data to improve effective memory transfer rates to thereby improve system performance. The cache is usually implemented by semiconductor memory devices having speeds that are comparable to the speed of the processor, while the system memory utilizes a less costly, lower speed technology.

A cache memory typically includes a plurality of memory locations that each stores a block or a "line" of two or more words. Each line in the cache has associated with it an address tag that is used to uniquely identify the address of the line. The address tags are typically included within a tag array memory device. Additional bits may further be stored for each line along with the address tag to identify the coherency state of the line.

A processor may read from or write directly into one or more lines in the cache if the lines are present in the cache and if the coherency state allows the access. For example, when a read request originates in the processor for a new word, whether data or instruction, an address tag comparison is made to determine whether a valid copy of the requested word resides in a line of the cache memory. If the line is present, a cache "hit" has occurred and the data is used directly from the cache. If the line is not present, a cache "miss" has occurred and a line containing the requested word is retrieved from the system memory and may be stored in the cache memory. The requested line is simultaneously supplied to the processor to satisfy the request.

Similarly, when the processor generates a write request, an address tag comparison is made to determine whether the line into which data is to be written resides in the cache. If the line is present, the data may be written directly into the cache (assuming the coherency state for the line allows for such modification). If the line does not exist in the cache, a line corresponding to the address being written may be allocated within the cache, and the data may be written into the allocated line.

Because two or more copies of a particular piece of data can exist in more than one storage location within a cache-based computer system, coherency among the data is necessary. Various coherency protocols and specialized bus transfer mechanisms may be employed for this purpose depending on the complexity of the system as well as its requirements. For example, coherence between the cache and the system memory during processor writes may be maintained by employing either a "write-through" or a "write-back" technique. The former technique guarantees consistency between the cache and the system memory by writing the same data to both locations. The latter technique handles coherency by writing only to the cache, and by marking the entry in the cache as being modified. When a modified cache entry is later removed during a cache replacement cycle (or is required by a device other than the processor), the modified data is typically written back to the system memory (and/or provided to the requesting device).

In a multiprocessor shared-memory computer system, separate caches associated with each of the processors may simultaneously store data corresponding to the same memory location. Thus, memory coherency within such systems must typically be handled using somewhat more elaborate and complex schemes. For example, coherency in multiprocessor shared-memory systems may be maintained through employment of either a directory-based protocol or a snooping protocol. In a directory-based protocol, a directory is maintained that indicates which processors have copies of each cache line. This directory is used to limit the processors that must monitor, and possibly respond to, a given request for a cache line. The use of directories reduces snoop traffic and thus allows larger systems to be built. However, the use of directories typically increases the system's latency (which is caused by the directory lookup), as well as the system's hardware complexity and cost.

In a snooping protocol, each processor broadcasts all of its requests for cache lines to all other processors. In many systems, this may be done through a common shared bus. The cache associated with each processor stores along with its address tags coherency information indicating the state of each of its stored lines. Each processor snoops the requests from other processors and responds accordingly by updating its cache tags and/or by providing the data. Thus, each request from another processor may require that a given processor access its own cache's tags to determine if the line exists within the cache, and to update the tag and/or provide the data if necessary. In systems that store cache tags off-chip, the rate at which these cache tags can be accessed can put a limit on the rate at which snoops can be processed. Unfortunately, this snoop bandwidth limit in turn limits the number of processors that can be supported in a system.

One solution to this problem is to store the cache tags on-chip (on the same chip as the processor), even for cache lines that are stored off-chip. However, this solution suffers from several serious drawbacks, including the large amount of processor area that must be devoted to maintain these cache tags, the lack of flexibility in changing off-chip cache sizes and organizations, and an increased latency when the data is present in the off-chip cache. Therefore, a cache memory subsystem is desirable that may allow significantly increased snoop bandwidth without requiring the use of directories or on-chip cache tags.

SUMMARY OF THE INVENTION

The problems outlined above may in large part be solved by a cache memory subsystem that enables the concurrent accessing of multiple cache tags in response to a plurality of snoop requests. In one embodiment, the cache memory subsystem includes a cache controller coupled to a cache memory. The cache memory includes a plurality of memory chips, or other separately addressable memory sections, which are configured to collectively store a plurality of cache lines. Each cache line includes data and an associated cache tag. The cache tag may include an address tag which identifies the line as well as state information indicating the coherency state for the line. Each cache line is stored across the memory chips in a row formed by corresponding entries (i.e., entries accessed using the same index address). The plurality of cache lines is grouped into separate subsets based on index addresses, thereby forming several separate classes of cache lines. The cache tags associated with cache lines of different classes are stored in different memory chips. During operation, the cache controller may receive multiple snoop requests corresponding to, for example, transactions initiated by various processors residing on a shared bus. The cache controller is configured to concurrently access the cache tags of multiple lines in response to the snoop requests if the lines correspond to differing classes. In this manner, multiple snoop requests may be serviced simultaneously to thereby significantly increase snoop bandwidth.

In one particular embodiment, in response to receiving a plurality of snoop requests corresponding to various transactions occurring on a system bus, the cache controller determines the class to which each request belongs. The class to which a particular request belongs may be based upon, for example, certain bits of the address associated with the request. For example, in one embodiment, the class is determined by certain upper order bits of an index portion of the address of a snoop request. The cache controller subsequently drives the index addresses for requests of different classes simultaneously to the address lines of respective memory chips to thereby perform a number of cache tag read operations simultaneously. If none of the reads require accessing the data or changing the cache tags, the snooping for those requests is complete. If one or more of the snoop requests require that the corresponding cache tags be updated, such updates may be performed in parallel for cache lines of different classes. Finally, if any snoop requests require that corresponding data be read from a particular cached line, a separate access may be performed to read the data. Such a data read operation may be performed simultaneously with a tag access. Because most snoops do not require changing the cache tag and/or reading the cache line data, a substantial increase in snoop bandwidth may be advantageously attained.

BRIEF DESCRIPTION OF THE DRAWINGS

Other objects and advantages of the invention will become apparent upon reading the following detailed description and upon reference to the accompanying drawings in which:

FIG. 5 is a block diagram illustrating further aspects of a cache memory subsystem.

Figure 1:
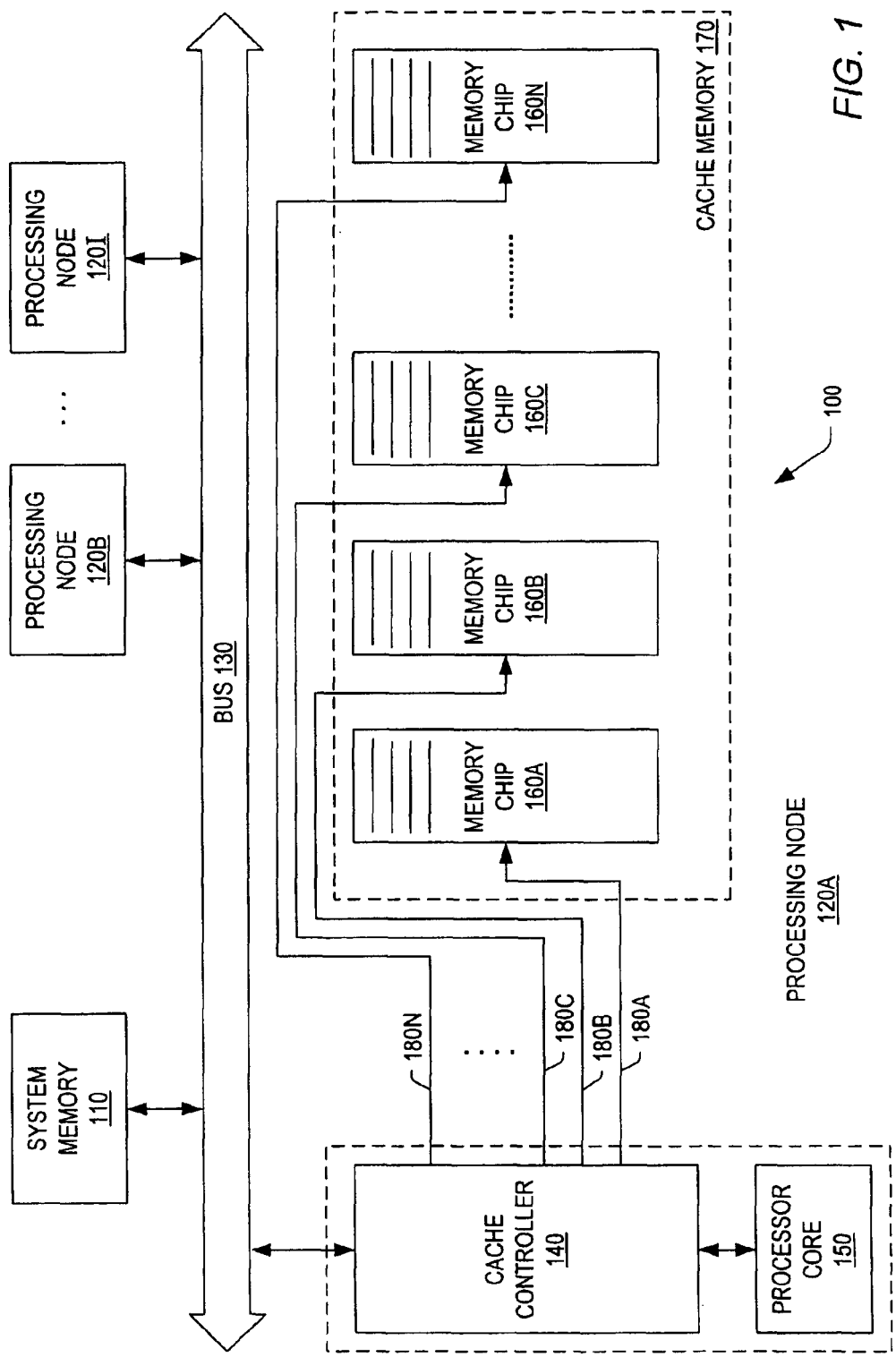
FIG. 1 is a block diagram of a multiprocessing computer system employing a cache memory subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Turning now to FIG. 1, a block diagram of a computer system 100 is shown. Computer system 100 includes a plurality of processing nodes 120A, 120B . . . 120I and a system memory 110 interconnected through a bus 130. Processing node 120A illustratively includes a cache controller 140 coupled to a processor core 150 and a cache memory 170. Cache controller 140 and cache memory 170 are collectively referred to as a cache-memory subsystem. In FIG. 1, for simplicity, elements shown within the processing node 120A are not shown within processing nodes 120B and 120I. However, it is noted that processing nodes 120B . . . 120N may be configured identically to processing node 120A, as illustrated.

In one embodiment, processor core 150 and cache controller 140 are integrated upon a common integrated circuit chip. In other embodiments, processor core 150, cache controller 140, and cache memory 170 may be implemented upon separate integrated circuit chips, or collectively upon a common integrated circuit chip.

Furthermore, processor core 150 may implement any of a variety of specific microprocessor architectures. For example, processor core 150 may implement the SPARC™ processor architecture.

In this description, the use of a numeric alone may be employed to collectively reference elements that share the same numeric. For example, processing nodes 120 may be used to reference processing nodes 120A, 120B . . . 120I, collectively.

In the embodiment of FIG. 1, cache memory 170 includes a number of memory chips 160A, 160B, 160C . . . 160N. Preferably the memory chips 160 are SRAM or other similar types of fast memory devices. During operation, cache memory 170 stores a plurality of cache lines, where each cache line is stored in a row formed by corresponding entries of memory chips 160A–160N. In other words, a given cache line is stored across a set of locations of memory chips 160 that is accessed using a common index address.

As illustrated in FIG. 1, each of the memory chips 160A–160N is separately addressable by the cache controller 140 through address buses 180A–180N, respectively. Thus, although a given cache line may be accessed in its entirety by driving a common index address concurrently upon each of the address buses 180A–180N, in certain situations as discussed below, each memory chip 160 may be separately and independently accessed. It is noted that various additional lines (not shown) for transmitting control signals to thereby read or write addressed entries of the cache may further be coupled between cache controller 140 and each of memory chips 160.

Figure 2:
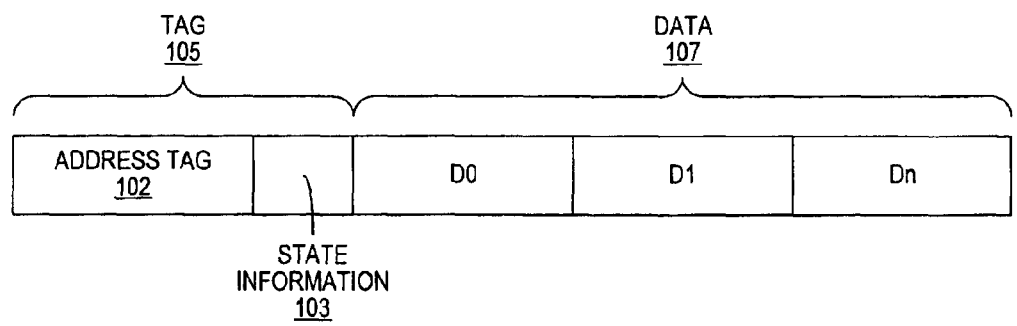
FIG. 2 is a diagram illustrating an exemplary organization of information stored within a cache line in the cache memory subsystem of FIG. 1.

FIG. 2 illustrates an exemplary organization of information stored within a cache line of cache memory 170. As illustrated, a cache line includes a tag field 105 and a data field 107. Tag field 105 includes an address tag field 102 to store an address tag corresponding to the stored line, and a state information field 103 to store information indicating the coherency state for the line. Various coherency codes may be stored within state information field 103 depending on the specific coherency protocol used. For example, in one embodiment, a MESI protocol is employed wherein a given cache line may be in Modified state, an Exclusive state, a Shared state, or an Invalid state. Data field 107 stores multiple words of data corresponding to the cache line. It is noted that the tag field 105 and data field 107 may be of various widths depending on the design and implementation of computer system 100. For example, in one exemplary embodiment, data field 107 stores 32 bytes (256 bits) of data.

As will be described in further detail below, the cache memory of FIG. 1 is configured such that cache lines are categorized into classes (or groups). The class to which a particular line belongs may depend upon its index address (i.e., the address used to access an entry within memory chips 160). The tags of lines belonging to different classes are stored in different memory chips 160 of the cache memory. Cache controller 140 is advantageously capable of accessing the tags of lines of different classes concurrently to thereby service multiple snoop requests concurrently.

Figure 3:
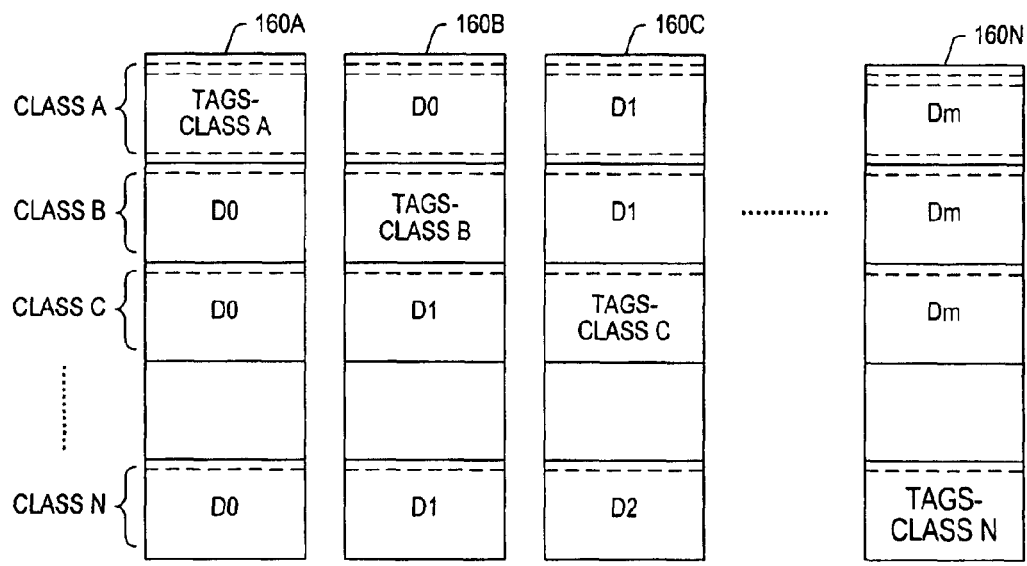
FIG. 3 is a diagram illustrating an exemplary distribution of data and tags in the cache memory subsystem of FIG. 1.

FIG. 3 depicts an exemplary partitioning to form differing classes of cache lines stored within memory chips 160. As illustrated in FIG. 3, the tags for lines of a given class are all stored in the same memory chip, and tags for lines of differing classes are stored in other memory chips. For example, the tags for the plurality of lines defined within "class A" are all stored within memory chip 160A, and the tags corresponding to lines defined within class B are all stored within memory chip 160B, and so on. As is further illustrated in FIG. 3, the data portions (D0, D1, . . . , Dm) of each cache line are distributed across the remaining portions of each row formed by corresponding entries of the memory chips 160. For example, for cache lines belonging to class A, a first portion of the data D0 is stored in memory chip 160B, a second portion of the data D1 is stored in memory chip 160C, and a last portion of the data of each line is stored within memory chip 160N. The data of lines of other classes are similarly striped across the memory chips 160.

It is noted that in various embodiments, a portion of the data forming each cache line may further be stored along with the corresponding tag in a given memory chip. That is, for example, a portion of data belonging to each of the cache lines of class A may be stored within memory chip 160A adjacent the tag information for each line, depending upon the width of the tags and the width of each memory chip. Accordingly, a portion of the data corresponding to a particular cache line may be accessed with the cache tag with that line.

Figure 4:
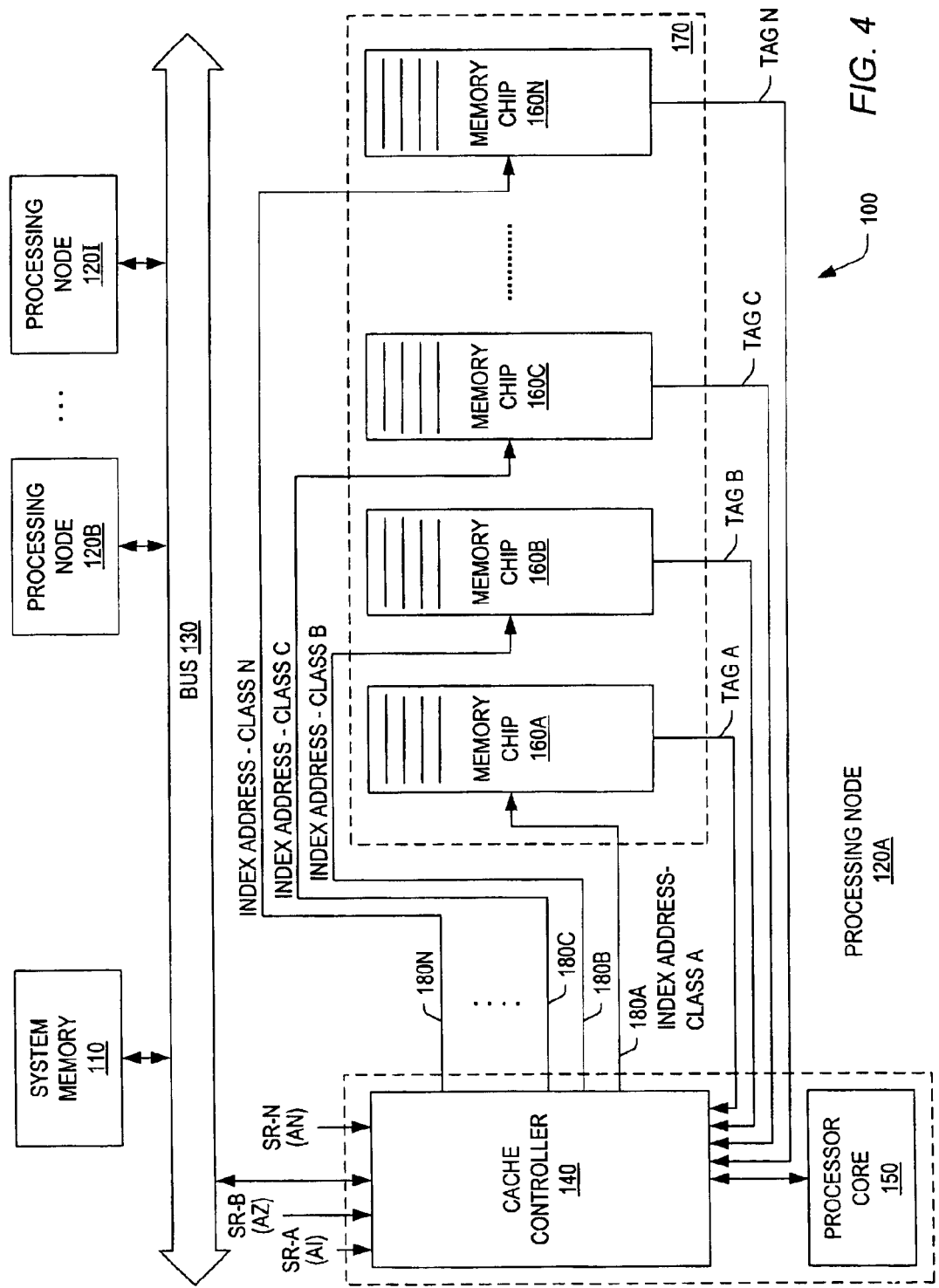
FIG. 4 is a block diagram that illustrates details of a cache memory subsystem.

The operation of the cache memory subsystem during snoop operations will next be considered with reference to FIGS. 4 and 5. FIGS. 4 and 5 illustrate portions of the cache memory subsystem of FIG. 1. Elements in FIGS. 4 and 5 that correspond to those of FIG. 1 are labeled identically for simplicity and clarity.

Referring to FIG. 4, during operation of computer system 100, cache controller 140 may receive a plurality of snoop requests SR-A, SR-B, . . . SR-N corresponding to transactions occurring on bus 130. These snoop requests may correspond to, for example, transactions initiated upon bus 130 by various masters such as processing nodes 120B–120I.

Each of these snoop requests includes a corresponding address (designated as A1, A2 . . . AN) specifying the memory location being accessed. An index portion of each of these addresses, which typically consists of certain lower order bits of the address, is used as an index to address memory chips 160 to thereby access a corresponding entry within the cache memory. The address associated with each snoop request further includes an address tag portion (which typically consists of certain upper order bits of the address). The address tag portion of the address associated with each snoop request is compared with the address tag stored within an indexed entry of the cache memory to determine whether a cache hit has occurred (i.e., to determine whether an entry exists within the cache which corresponds to the snoop address).

Cache controller 140 processes the snoop requests by determining the class to which each snoop request belongs. As stated previously, this determination may be based upon the index portion of the specific address associated with each snoop request. For example, depending upon the number of classes, a number of bits of the index portion of the address may be used to designate the class to which the particular request belongs. Accordingly, if the cache memory is partitioned into four different classes, for example, two dedicated bits of the index address (e.g., the two uppermost-order bits, the two lowest-order bits, etc.) may be used to define the class to which a particular address belongs.

To determine whether any specific action is required by cache controller 140 for each snoop request, the tag corresponding to each snoop request must be read from the cache memory. As stated previously, the tags for cache lines belonging to different classes are stored in different memory chips 160. If, as depicted in FIG. 4, each of the snoop requests SR-A through SR-N correspond to different classes, cache controller 140 is configured to convey the index addresses corresponding to each of the snoop requests concurrently upon the appropriate address lines 180A–180N to thereby read the associated tags (Tag A, Tag B, Tag C . . . Tag N, as depicted).

Cache controller 140 responsively determines whether any subsequent coherency action must be taken. For example, cache controller 140 determines whether a particular tag must be updated and/or whether data corresponding to a particular line must be read from cache memory 170 to be, for example, written back to system memory 110 or transferred to another system resource via bus 130. Specific details regarding these operations will be discussed next.

Consider a situation wherein, for example, the tag read from one of the memory chips 160 in response to a particular snoop request is examined and it is determined by cache controller 140 that a cache miss occurred (i.e., the address tag of the stored line did not match with the tag portion of the snoop request address). Typically in this case, no further action by cache controller 140 is necessary, and the snoop operation is complete. If a cache miss occurs for the snoop request of all of the classes during a particular cycle, subsequent snoop requests can be processed in parallel during subsequent clock cycles.

In certain situations, it may be necessary to update the tag for a particular cache line in response to a received snoop request. For example, a given snoop request may require that the state information maintained for a corresponding line be changed from Exclusive to Shared or from Shared to Invalid, etc. In such situations, after the cache tag is read from the corresponding memory chip 160 and cache controller 140 determines that an update is necessary, in a later cycle, the cache controller writes the updated tag information within the corresponding entry of the particular memory chip 160 containing the tag to be updated. It is noted that this operation may be performed concurrently with the updating of tag information corresponding to cache lines of other classes, or concurrently with other tag read operations (as described previously in response to snoop requests of other classes). For example, FIG. 5 illustrates a situation wherein updated cache tag information is stored by cache controller 140 within memory chips 160B and 160C (corresponding to classes B and C, respectively), while at the same time tag information is read from memory chips 160A and 160N to service a pair of snoop requests corresponding to classes A and N, respectively. These concurrent operations may further facilitate increases in snoop bandwidth.

Similarly, in some situations, it may be necessary to read the data corresponding to a particular cache line in response to a snoop request. For example, it may be necessary to write modified data within a particular cache line back to system memory 110. In such situations, cache controller 140 provides the index address for the required data to read the needed data from the corresponding memory chips 160. For example, as depicted in FIG. 5, if data corresponding to a line belonging to class B must be read from the cache memory, cache controller 140 drives address lines 180A, 180C and 180N with the index value corresponding to that line. The data of that line can thereby be read from the cache memory, and may be provided to bus 130 or system memory 110 by cache controller 140, as needed. During these operations, it is noted that the memory chip containing the tag information for that line may be accessed independently. For example, new state information for the line being read may be stored within the entry of the memory chip 160B at the same time the corresponding data is being read from memory chips 160A, 160C and 160N. Alternatively, accesses corresponding to other indexed entries of memory chip 160B may be performed, as desired, while the data is being read from memory chips 160A, 160C and 160N.

For embodiments wherein a portion of data corresponding to a cache line is stored within a particular memory chip along with the line's tag, it is noted that cache controller 140 may hold the data read along with the address tag, until it is determined whether the data will need to be written back to system memory. In such situations, the data is merged with the remaining data of the line which is accessed during subsequent cycles, as described previously. Similarly, if a cache tag must be updated, the appropriate data is stored along with the cache tag.

In one embodiment, cache tag reads in response to snoop requests corresponding to the same class are performed during differing cycles. In addition, during certain cycles if snoop requests corresponding to particular classes are not pending, accesses to some of the memory chips may not be performed. Enhanced efficiency may be attained by requiring that every set of N consecutive broadcasts of cache line requests access at most one cache line in each class (null requests may need to be added in order to satisfy this property).

As described above, since cache controller 140 is capable of simultaneously accessing the cache tags associated with cache lines of differing classes concurrently, multiple snoop requests may be serviced concurrently. In this manner, snoop bandwidth may be significantly increased.

It is noted that in the embodiment of FIG. 1, cache controller 140 is further configured to service requests received from processor core 150. An entire cache line is typically accessed in response to processor core requests due to the probability that a cache hit will occur. Such operations may be performed in a conventional manner.

It is also noted that in other embodiments of computer system 100, system memory 110 may be a distributed memory structure that is distributed across multiple nodes interconnected by a network. Bus 130 may be a dedicated bus, a shared system bus, or an interconnection network.

While the present invention has been described with reference to particular embodiments, it will be understood that the embodiments are illustrative and that the invention scope is not so limited. Any variations, modifications, additions and improvements to the embodiments described are possible. These variations, modifications, additions and improvements may fall within the scope of the invention as detailed within the following claims.

What is claimed is:

1. A cache memory system comprising:

a cache controller; and a cache memory coupled to said cache controller for storing a plurality of cache lines, wherein said cache memory includes a plurality of memory sections, wherein each of said memory sections is separately addressable through separate address lines coupled to said cache controller, and wherein each cache line includes an address tag and corresponding data;

wherein said cache controller is configured to store a portion of each of said plurality of cache lines in each of said plurality of memory sections, and wherein said cache controller is further configured to read a portion of a particular cache line concurrently with writing another portion of the particular cache line.

2. The cache memory system as recited in claim 1, wherein said cache controller is configured to read the data of the particular cache line concurrently with writing the address tag of the particular cache line.

3. The cache memory system as recited in claim 1, wherein said cache controller is further configured to concurrently access the address tag corresponding to a second cacheline and the address tag corresponding to a third cache line.

4. The cache memory system as recited in claim 3, wherein said second cache line corresponds to a given snoop request and wherein said third cache line corresponds to another snoop request.

5. The cache memory system as recited in claim 1, wherein each of said plurality of memory sections is provided on a separate memory chip.

6. The cache memory system as recited in claim 1, wherein said address tag of each cache line is included in a tag field, and wherein said tag field further stores state information indicative of a coherency state of said corresponding data.

7. The cache memory system as recited in claim 6, wherein each of said plurality of memory sections is provided on a separate memory chip.

8. A computer system comprising:

a processor;

a cache controller coupled to the processor; and a cache memory coupled to said cache controller for storing a plurality of cache lines, wherein said cache memory includes a plurality of memory sections, wherein each of said memory sections is separately addressable through separate address lines coupled to said cache controller, and wherein each cache line includes an address tag and corresponding data;

wherein said cache controller is configured to store a portion of each of said plurality of cache lines in each of said plurality of memory sections, and wherein said cache controller is further configured to read a portion of a particular cache line concurrently with writing another portion of the particular cache line.

9. The computer system as recited in claim 8, wherein said cache controller is configured to read the data of the particular cache line concurrently with writing the address tag of the particular cache line.

10. The computer system as recited in claim 8, wherein said cache controller is configured to concurrently access the first address tag corresponding to a second cache line and the address tag corresponding to a third cache line.

11. The computer system as recited in claim 10, wherein said second cache line corresponds to a given snoop request and wherein said third cache line corresponds to another snoop request.

12. The computer system as recited in claim 8, wherein each of said plurality of memory sections is provided on a separate memory chip.

13. The computer system as recited in claim 8, wherein said address tag of each cache line is included in a tag field, and wherein said tag field further stores state information indicative of a coherency state of said corresponding data.

14. A cache memory system comprising:

a cache controller; and a cache memory coupled to said cache controller for storing a plurality of cache lines, wherein said cache memory includes a plurality of memory sections, wherein each of said memory sections is separately addressable through separate address lines coupled to said cache controller, and wherein each cache line includes an address tag and corresponding data;

wherein said cache controller is configured to store a portion of each of said plurality of cache lines in each of said plurality of memory sections, and wherein said cache controller is further configured to read a portion of a first cache line concurrently with writing a portion of a second cache line.

15. The cache memory system as recited in claim 14, wherein said cache controller is configured to read the data of the first cache line concurrently with writing the address tag of the second cache line.

16. The cache memory system as recited in claim 14, wherein said first cache line corresponds to a given snoop request and wherein said second cache line corresponds to a another snoop request.

17. The cache memory system as recited in claim 14, wherein each of said plurality of memory sections is provided on a separate memory chip.

18. The cache memory system as recited in claim 14, wherein said address tag of each cache line is included in a tag field, and wherein said tag field further stores state information indicative of a coherency state of said corresponding data.

19. A computer system comprising:

a processor;

a cache controller coupled to the processor; and a cache memory coupled to said cache controller for storing a plurality of cache lines, wherein said cache memory includes a plurality of memory sections, wherein each of said memory sections is separately addressable through separate address lines coupled to said cache controller, and wherein each cache line includes an address tag and corresponding data;

wherein said cache controller is configured to store a portion of each of said plurality of cache lines in each of said plurality of memory sections, and wherein said cache controller is further configured to read a portion of a first cache line concurrently with writing a portion of a second cache line.

20. The computer system as recited in claim 19, wherein said cache controller is configured to read the data of the first cache line concurrently with writing the address tag of the second cache line.

21. The computer system as recited in claim 19, wherein said first cache line corresponds to a given snoop request and wherein said second cache line corresponds to a another snoop request.

22. The computer system as recited in claim 19, wherein each of said plurality of memory sections is provided on a separate memory chip.

23. The computer system as recited in claim 19, wherein said address tag of each cache line is included in a tag field, and wherein said tag field further stores state information indicative of a coherency state of said corresponding data.

* * * * *